United States Patent Office 2,934,524
Patented Apr. 26, 1960

2,934,524

PROCESS FOR COPOLYMERIZING ACRYLIC COMPOUNDS

Virginia A. Phelps, Oakmont, Pa., and Harry H. Weinstock, Jr., Madison, N.J., assignors to Allied Chemical Corporation, a corporation of New York No Drawing. Application June 29, 1955
Serial No. 518,965

18 Claims. (Cl. 260—80.5)

This invention is directed to a process for copolymerizing a major amount of acrylonitrile or of acrylonitrile and an amide of acrylic or methacrylic acid with a minor amount of an ester of acrylic or methacrylic acid.

It is known to polymerize acrylic monomers dispersed in water, either as solutions or as suspensions or emulsions of liquid monomer dispersed in the aqueous medium. In the emulsion procedure, agitation of the reaction mixture with the emulsifying agent present results in the polymer being formed as a very fine suspension in the aqueous reaction medium. It is difficult, if not impossible, to filter out the polymer by usual filtration methods without first coagulating the polymer. In the suspension procedure no emulsifying agent is present and if a dispersion aid is employed, it is one which does not induce the formation of an emulsion or non-filterable suspension or slurry. The suspension procedure may be carried out with or without having present any of the commonly known dispersing agents, for example colloidal dispersants. The product of such suspension process may range from a filterable slurry of the polymer in the aqueous reaction medium to one in which the polymer is in relatively large agglomerates or curd-like masses, depending upon the conditions under which the polymerization is carried out.

This invention relates to the field of polymerizations initiated in an aqueous dispersion of liquid monomers, as solutions, emulsions or suspensions. In its more specific and preferred embodiments, it relates to processes in which polymerization is initiated in the aqueous medium-liquid monomer dispersion, and additional monomer is either continuously or intermittently supplied to the reaction mixture with suitable catalyst additions as may be necessary or desirable to promote the polymerization reactions. By so doing, the ratio of total monomer supplied to the aqueous reaction medium is increased and for any given percent conversion of monomer to polymer, the amount of polymer which may be produced by carrying the reaction out in a limited amount of aqueous reaction medium is increased.

It is well known that the character of a polymer is determined not only by the monomer or monomers which are polymerized but also by the conditions under which the polymerization is carried out. Numerous oxidizing agents are known to catalyze the polymerization of vinyl and vinylidene compounds. Further, it is known to promote polymerization of these compounds by having present both an oxidizing agent, such as a persulfate, and a reducing agent such as an alkali metal bisulfite. These oxidizing-reducing catalysts are known as redox catalysts. We have found the specific combination of persulfate with a bisulfite of a metal of group II, Series 3 to 7, and ferrous iron, is particularly effective for promoting the copolymerization of acrylonitrile, permissibly with a minor amount of one or both of the amides of acrylic and methacrylic acids also present, with one or more of the saturated aliphatic esters of acrylic or methacrylic acids in an aqueous dispersion of these monomers.

We have further discovered that by employing our novel combination of persulfate-bisulfite-ferrous iron for the copolymerization of the foregoing monomers in aqueous dispersions containing the monomers in certain proportions, with addition of monomers to the reaction mixture in which polymerization is initiated, readily filterable slurries of polymer are produced, which retain a low water content in the filter cake. The polymer has a relatively uniform, low reduced viscosity, i.e. uniform, low molecular weight. These and other advantages of our invention will appear in more detail in connection with a description of the novel processes to which this invention is directed.

The desirable results pointed out above are obtained only when certain conditions are maintained in polymerizing the monomers. The procedural steps characterizing the present invention in its broadest aspect and distinguishing it from other polymerization processes heretofore disclosed, are:

(1) A monomer mixture of acrylonitrile, at least one of the saturated aliphatic esters of acrylic and methacrylic acids and 0 to 15%, by weight of the monomer mixture, of amides of acrylic and methacrylic acids, in which mixture the relative amounts of these materials are such that the ratio by weight of acrylonitrile to total amide is greater than 5/1 and the total of monomeric acrylonitrile and amide amounts to more than 50% and the monomeric ester amounts to less than 50%, is copolymerized dispersed in an aqueous reaction medium. The acrylonitrile plus any amide of acrylic or methacrylic acids present may amount to as much as about 95% by weight of the total monomers, preferably being substantially 70% to 90%, with the remaining about 5% or preferred 30% to 10% of the monomer mixture being the alkyl ester of acrylic acid. Further, this ester is preferably a lower (up to 10 carbon atoms in this alkyl radical), saturated alkyl ester of acrylic acid. All these percentages are by weight of the monomer mixture.

(2) The polymerization reactions are promoted by having present in solution in the aqueous medium a catalyst comprising an alkali metal (including ammonium) persulfate and a bisulfate and iron as activator, with the bisulfate introduced into the aqueous reaction medium in the form of a bisulfate of a metal of group II, Series 3 to 7, of the periodic arrangement of the elements, and the iron introduced in the form of ferrous iron ($Fe^{++}$).

In its preferred, more specific aspects, our invention is further characterized by initiating the polymerization in an aqueous suspension of liquid monomer in which the water/monomer ratio (by weight) is at least substantially 15/1 and after initiation of the polymerization reaction additional monomers are introduced, either continuously or intermittently as the polymerization proceeds, until the water/total monomer ratio has been reduced to no greater than about 8/1, and preferably is in the range of about 2/1 to about 5/1. The minimum value for this ratio is about 1.5/1, at which the reaction product still remains in the form of a mobile, filterable dispersion of polymer in aqueous liquid.

In further explanation of the features characterizing this invention; the process is peculiarly suitable for copolymerizing a major amount of acrylonitrile and a minor amount of an alkyl ester of acrylic or methacrylic acid. It was also found that up to about 15% of the acrylonitrile may be substituted by acrylamide or methacrylamide and the resulting mixture of three or more monomers behaves similarly to the binary mixture of acrylonitrile and ester when polymerized by the process of this invention. Accordingly, the invention includes the copolymerization of mixture of acrylonitrile, acrylamide or methacrylamide and alkyl ester of acrylic acid or methacrylic acids in the proportions set forth above.

The alkyl (saturated aliphatic) esters of acrylic or methacrylic acid which will be copolymerized with acrylonitrile, alone or with small amounts of the above-described amides employing the process of this invention, will be determined by the uses to which the copolymers are to be put, such as for the production of films, filaments or fibers or for molding into shaped articles, since our process is applicable to the preparation of all such copolymers. The coplymers of the lower alkyl esters of acrylic acid, the esters of the series methyl through decyl acrylates, are particularly useful for fibers and films. The relatively low and uniform molecular weight of the copolymers prepared by this process is especially advantageous when solutions of the copolymers in solvent are to be spun into fibers.

The monomers may be introduced into the aqueous reaction medium as a mixture of the monomers or the several monomers may be introduced separately in the required proportions. Our novel persulfate-bisulfite-ferrous iron combination is effective for either batch or continuously operating procedures. In a batch operation all the monomers may be, and generally are, added in making up the initial reaction mixture.

In our preferred procedure, only a portion of the monomers is initially added and in making subsequent monomer additions the rate at which the monomers are added should not greatly exceed that rate at which the monomers are polymerized. It is preferred to add monomers in amounts such that the ratio of water/monomer present at all times throughout the polymerization (hereinafter referred to as the water/existing monomer ratio) is at least substantially 15/1 by weight and at about the rate at which the monomers are polymerized.

The preferred processes may be carried out continuously by initiating the polymerization and adding monomers to the initial reaction mixture under the conditions herein described until a pool of reaction mixture containing dispersed polymer is established by addition of monomer to a water/total monomer ratio in the ranges defined above. To this pool further monomer, water, catalyst and ferrous iron may be continuously or intermittently added and corresponding amounts of aqueous dispersion of polymer constituting the pool may be withdrawn for recovery of the polymer therefrom; always so correlating the additions and withdrawals from the pool that its composition remains within the limits defined herein for operating within the scope of the invention.

While the specified acrylonitrile and esters, with or without the amides, essentially constitute the monomers employed in carrying out this invention, it is not necessary to exclude all other monomeric compounds which may be copolymerized with acrylonitrile under the conditions under which the process of this invention is carried out. Such additional polymerizable materials may be present in small amount with respect both to the amount of acrylonitrile and the amount of the esters of acrylic acid or methacrylic acid which is present, such that the polymerization carried out is essentially that of a copolymerization of acrylonitrile with the esters of acrylic and methacrylic acids.

When the acrylonitrile amounts to more than 90% of the monomers it is more difficult to obtain the desired product having a high content of polymer in a filterable slurry of substantially uniformly small polymer particles. This may be facilitated, however, by employing an initial reaction mixture which contains higher water/monomer ratios up to about 30/1 when the acrylonitrile amounts to 95% of the monomer ratio.

With respect to the catalyst and promotor, any of the alkali metal persulfates, including ammonium persulfate, may be employed. The amount of $S_2O_8$ as persulfate in the aqueous reaction medium in which polymerization is initiated should be above 1% and may be as high as, for example, 7% but should not exceed about 9%, the preferred range being about 1.5% to about 3%. These values are for percent $S_2O_8$ based on the weight of monomer present. The bisulfite (calculated as $HSO_3$ from iodine-thiosulfate titration of the bisulfite solution added to the polymerization mixture, and also based on the weight of monomer present) should amount to about 0.5% or higher, but should not exceed about 5%. Preferably, it is about 1% to about 2%.

Particularly when monomer additions to the reaction mixture are made in accordance with our preferred procedure and are to be carried to a water/total monomer ratio of about 5/1 or less, unless the catalyst concentrations employed are at least the preferred minimum of about 1.5% persulfate as $S_2O_8$ and about 1% bisulfite as $HSO_3$, and are no greater than 7% persulfate and 5% bisulfite, the ratio of persulfate to bisulfite and the total amounts of these catalyst constituents in the initial reaction mixture should be such that the rate of polymerization over a period of about 7 minutes following initiation of the polymerization is not less than 7% of the monomer present converted to polymer per minute, and the polymer formed during this initial reaction period has a reduced viscosity no greater than 1.5. A too high reduced viscosity results from a low total concentration of persulfate and bisulfite or from a high ratio of persulfate to bisulfite. Increasing this total catalyst concertation offsets the tendency of a high persulfate/bisulfite ratio to cause formation of polymer with high reduced viscosity. A too low initial reaction rate results from a too low total catalyst concentration. Within the broader ranges of persulfate and bisulfite concentrations described above, and without using excessive concentrations of either pursulfate or bisulfite which cause salting out of constituents of the reaction mixture, any needed adjustment in catalyst concentrations may be made in the respects described above to assure the proper polymerization rate and reduced viscosity of the polymer formed during the initial reaction period.

The reduced viscosities given throughout this specification are based on the viscosity of a 1.25% solution of the polymer in N,N-dimethyl formamide at 40° C.

These conditions pertain to the catalyst concentration in the reaction mixture in which the polymerization is initiated. In order to obtain all of the advantages of this invention, further catalyst additions should be made as catalyst is used up during the polymerization. Without such catalyst additions, while the rate of polymerization does not decrease to a marked degree until a point is reached at which the catalyst is almost exhausted in the solution, the reduction in amount of catalyst present does result in increase in the reduced viscosity of the polymer being formed. This leads to less uniformity in the reduced viscosity and molecular weight of the product. It also results in the production of thicker suspensions of polymer in the aqueous medium. While it is within the scope of this invention to operate without catalyst additions subsequent to the initiation of the polymerization, it is much preferred to add persulfate and bisulfite as necessary to maintain a substantially uniform reduced viscosity of the polymer formed throughout the polymerization. This facilitates the addition of monomers to a low water/total monomer ratio while maintaining desirable uniform low reduced viscosities of the polymer.

The iron may be incorporated in the reaction mixture in the form of any ferrous salt which is at least slightly soluble therein to provide the required iron content. If a ferric salt is used, it must be reduced so that substantially all the iron present in the reaction mixture when the polymerization is initiated, is present as ferrous iron. When a ferric salt is to be used, it is preferred to introduce this salt into the bisulfite solution containing excess sulfur dioxide which will reduce the ferric iron to ferrous iron. Better yet, whether ferric or ferrous salt is to be used, it is added to a slurry of an oxide or hydroxide of the metal of group II which, by heating the slurry with sulfur dioxide, is converted into the desired bisulfite. In this case the treatment of the slurry with sulfur dioxide is continued until the characteristic yellow color imparted to the solution by any ferric iron present is discharged, showing that substantially all the iron is present as ferrous iron.

Particularly with reference to the preferred process, the amount of total iron present initially is correlated with the amount of bisulfite present so that the reaction mixture in which the polymerization is initiated contains at least 0.01 part of iron for every 100 parts of bisulfite as $HSO_3$. Preferably, the iron amounts to about 0.02 to about 0.03 part per 100 parts bisulfite. Following the initial polymerization period, no additional iron need be, but it may be, introduced into the reaction mixture as monomer and catalyst are added. Increasing the iron concentration above the preferred amounts gives faster polymerization rates with little change in the reduced viscosity of the polymer initially formed, but results in the final polymer product having a higher reduced viscosity, especially when the iron amounts to as much as 0.27 part per 100 parts of bisulfite. This high iron concentration also causes a rapid depletion of the catalyst, requiring increasingly careful control of catalyst additions to the reaction mixture as the polymerization proceeds, and increases the amount of iron in the polymer product which in many cases is undesirable. The iron should not amount to more than 0.6 part for every 100 parts bisulfite. All these values for the iron present are expressed in parts by weight of iron ($Fe^{++}$) and of bisulfite calculated as $HSO_3$.

It is a particular advantage of the preferred process of this invention operated under the preferred conditions, as compared with procedures of the prior art, that the total quantity of catalyst required for producing a given amount of polymer, is considerably reduced and at the same time a polymer of relatively low molecular weight, as shown by a low reduced viscosity of the polymer product, is obtained.

The relatively uniform, low molecular weights of the products produced by our inventon are advantageous in imparting increased solubilities of the polymers in suitable solvents for spinning into fibers or casting as films.

It has also been found that by employing the catalysts of this invention, methyl methacrylate which has been purified by ordinary distillation methods is successfully copolymerized with acrylonitrile. Employing other catalysts, for example, sodium bisulfite instead of the bisulfite of a metal of group II used in carrying out this invention, it has been necessary to purify the methyl methacrylate by special distillation under an atmosphere of nitrogen gas for the copolymerization to proceed at adequate rates.

The conditions peculiarly affecting the polymerizations carried out in accordance with this invention have been described in detail above. Other conditions have similar effects whether the polymerization is carried out in accordance with the present invention or in other known manners. For example, the temperature affects the rate of polymerization and, accordingly, the times and amounts of monomer additions will be suitably varied, depending upon the temperature chosen for carrying out the polymerization. In general, operation at temperatures as high as 50°–60° C. and above is limited by the practicality of providing adequate cooling to remove the heat of reaction. Also, if the process is carried out at unduly high temperatures, there is a tendency for lumps of polymer to form in the final product. Accordingly, the process is best carried out at temperature of about 35° C. Nevertheless, if for some purpose it is desired to operate at higher temperatures while still producing polymers of relatively uniform molecular weight and obtaining other advantages permitted by employing our invention, higher temperatures may be maintained during the polymerization than these preferred temperatures.

The bisulfite employed is preferably prepared by absorption of sulfur dioxide gas in a slurry of an oxide or hydroxide of a metal of group II, Series 3 to 7, of the periodic arrangement of the elements, until a substantially clear solution is obtained containing the bisulfite. The $HSO_3$ theoretical titer of a solution of the several bisulfite salts of the metals of group II, Series 3 to 7, for every 1 part by weight of the metal present in the bisulfite calculated as the metal oxide, is as follows:

| | Parts by weight |
|---|---|
| Magnesium bisulfite | 4.00 |
| Calcium bisulfite | 2.90 |
| Zinc bisulfite | 2.00 |
| Strontium bisulfite | 1.85 |
| Cadmium bisulfite | 1.26 |

For use in carrying out the process of this invention, the bisulfite need not, however, have this theoretical titer. It is only necessary that the $HSO_3$ titer of the bisulfite solution be high enough for the salt to be soluble to the required extent in the reaction mixture. On the other hand, before the bisulfite is added to the reaction mixture in which the monomers are to be polymerized, it is desirable to remove sulfur dioxide in large excess over that corresponding to the bisulfite. This may be done, for example, by bubbling an inert gas such as nitrogen through an aqueous solution of the bisulfite. The preferred ranges of $HSO_3$ titer of a solution of the several bisulfites employed in carrying out this invention for every 1 part by weight of the metal present in the bisulfite calculated as the metal oxide, are from about 15% less than to about 10% greater than the theoretical titer. For example, the preferred ranges for magnesium and calcium bisulfite are

| | Parts $HSO_3$ |
|---|---|
| Magnesium bisulfite | 3.4 to 4.5 |
| Calcium bisulfite | 2.4 to 3.2 |

In employing calcium or strontium bisulfite and a ferrous sulfate in making up the polymerization mixture or in making subsequent additions thereto of these materials, the iron salt is best added directly to the reaction mixture rather than first adding it to the bisulfite solution. On the other hand, in employing magnesium or zinc bisulfite it is preferred to prepare a solution of these bisulfites containing the iron salt and to add this bisulfite-iron salt solution to the polymerization mixture.

This invention is further described and particularly illustrated by the following examples. Unless otherwise stated, amounts of material given in "parts" are in parts by weight; ferrous ammonium sulfate being the hexahydrated salt. Polymerization rates are in terms of percent of monomer present converted to polymer per minute (percent/min.). In all cases the reaction mixture was adequately stirred to keep the monomers and polymers dispersed in the aqueous reaction medium.

*Example 1.*—Eighteen parts of methyl acrylate and 162 parts of acrylonitrile were dispersed by stirring in 2700 parts of distilled water in a nitrogen atmosphere, and heated to 35° C. To this was added 5.4 parts ammonium persulfate and 70 parts of a solution of magnesium bisulfite titrating 3.9% $HSO_3$ and also containing 10 mgs. of iron per liter of solution. This magnesium bisulfite solution was prepared by the method hereinafter described. The composition of this initial reaction mixture thus prepared corresponded to 2.52% $S_2O_8$ and 1.5% $HSO_3$ (based on the monomers present) and 0.0259 part iron for every 100 parts magnesium bisulfite as $HSO_3$. The water-monomer ratio was substantially 15.4/1.

Polymerization started practically immediately upon introduction of the persulfate-bisulfite-ferrous salt and over the first 8 minutes proceeded at the rate of 7.7% per min. The reduced viscosity of the polymer formed during this initial reaction period was 0.84.

Over a total polymerization period of 5 hours, 90 parts of a mixture of methyl acrylate and acrylonitrile in the ratio of 10/90 were added at intervals of 8, 15, 24, 34, 49, 62, 80, 100, 130, 165 and 220 mins., making a total of 117 parts methyl acylate and 1053 parts acrylonitrile, including that employed in making up the initial reaction mixture. At 24, 49 and 80 mins. from the start of the polymerization, 3.6 parts of ammonium persulfate and 46 parts of magnesium bisulfite solution containing iron, were added, making a total of 16.2 parts ammonium persulfate and 208 parts of the bisulfite solution. The water-total monomer ratio was 2.48/1.

The following table shows for the indicated periods of time from start to end of the polymerization, the rates of polymerization during each of the several periods and the cumulative yields and reduced viscosities of the polymer present at the end of each period, yields being in percent of monomer introduced up to that time, which was converted into polymer.

| Period, mins. | Polymerization Rate, percent/min. | Cumulative Yields, percent | Reduced Viscosity |
|---|---|---|---|
| 0–8 | 7.7 | 62 | 0.84 |
| 8–24 | 4.8 | 84 | 1.2 |
| 24–49 | 3.5 | 95 | 1.1 |
| 49–80 | 2.6 | 94 | 0.87 |
| 80–130 | 1.7 | 96 | 1.11 |
| 130–300 | .53 | 97 | 1.11 |

At the end of the 5-hours reaction time, the reaction mixture was a creamy suspension of polymer with no coagulation of the polymer. It was filtered and washed with water. The filter cake thus obtained contained 47% water.

The magnesium bisulfite solution used in the above process was prepared by treating with sulfur dioxide an aqeuous suspension of 70 parts of magnesium oxide in 7000 parts water to which 0.497 part of ferrous ammonium sulphate had been added, corresponding to a ratio of 10 mgs. of Fe for every 10 gms. of magnesium oxide. The treatment with sulfur dioxide was continued until an essentially colorless solution was obtained. The solution thus produced titrated 3.86% $HSO_3$ and contained 10 mgs. of ferrous iron per liter.

The above procedure was substantially duplicated except in the following respects. It involved a continuous addition of monomer and catalyst following the initial reaction period. In making up the initial reaction mixture, ammonium persulfate amounting to 7.2 parts and 46 parts of a magnesium bisulfite solution titrating 3.90% $HSO_3$ and containing 10 mgs. ferrous iron per liter, were added to the monomer-water mixture. This corresponded to 3.37% $S_2O_8$ and 1% $HSO_3$ based on the monomers present, and 0.0256 part iron for every 100 parts bisulfite as $HSO_3$. Formation of polymer was perceptible after 15 secs. from the time the persulfate, bisulfite and ferrous salt were added. During the first 8 minutes following addition of the catalyst, the reaction proceeded at the rate of 7.1% per minute. The reduced viscosity of the polymer formed during this initial reaction period was 1.1.

Polymerization was continued over a period of 2 hours and 15 mins. During this time, a 10/90 mixture of methyl acrylate and acrylonitrile was substantially continuously added at rates such that 90 parts of the monomer mixture were introduced during each of the following periods after the initial 8-minute reaction period: 8–14, 14–22, 22–28, 28–35, 35–41, 41–52, 52–66, 66–78, 78–95 and 95–115 mins. At 115 mins., a final addition of 90 parts of the monomer mixture was made. Ammonium persulfate additions were made by dissolving 3.6 parts of ammonium persulfate in 76 parts of water (with a corresponding adjustment in the water used in making up the initial reaction mixture to employ 2624 parts instead of 2700 parts), and this persulfate solution was introduced into the reaction mixture during the 14–68 minute period of the polymerization at the rate of 1.5 parts of the solution per minute. During this same 14–68 minute period, 92 parts of magnesium bisulfite-ferrous salt solution of the same composition as that introduced in making up the initial reaction mixture, were added at the rate of 1.7 parts per minute. The following table shows for the several periods of time after catalyst addition, the data for this run:

| Period, mins. | Polymerization Rate, percent/min. | Cumulative Yields, percent | Reduced Viscosity |
|---|---|---|---|
| 8 | 7.1 | 57 | 1.1 |
| 14 | 5.3 | 57 | 1.2 |
| 20 | 7.9 | 71 | 1.4 |
| 30 | 6.0 | 81 | 1.6 |
| 40 | 5.75 | 83 | |
| 50 | 4.21 | 87 | 1.4 |
| 70 | 3.84 | 94 | |
| 90 | 3.35 | 95 | 1.3 |
| 135 | 2.3 | 98 | 1.4 |

The reaction product was a creamy polymer suspension with no coagulation. The washed filter cake contained 61% water.

*Example 2.*—Eighteen parts of methyl acrylate and 162 parts of acrylonitrile are dispersed by stirring in 2500 parts of distilled water in an atmosphere of nitrogen and heated to 35° C. Solid ammonium persulfate, 5.4 parts, 112 parts of a solution of calcium bisulfite (2.41% $HSO_3$ titer) and 0.008 part ferrous ammonium sulfate dissolved in a few mls. water, are added to the heated dispersion of the methyl acrylate and acrylonitrile. This composition of the initial reaction mixture corresponded to 2.5% $S_2O_8$ and 1.5% $HSO_3$, based on the monomers present, and 0.042 part iron for every 100 parts bisulfite as $HSO_3$. It contained a water/monomer ratio of 15.7/1. Substantially all the iron was present in the initial reaction mixture as ferrous iron.

Polymerization started practically immediately upon introduction of the persulfate-bisulfite-ferrous salt, and over the first 7 minutes proceeded at the rate of 9%/min. The reduced viscosity of the polymer formed during this initial reaction period was 0.86.

Over a total polymerization period of 300 minutes, 90 parts of a mixture of methyl acrylate and acrylonitrile in the ratio of 10/90 were added at intervals of 7, 15, 24, 34, 49, 62, 80, 100, 130, 165 and 220 minutes, making a total of 1170 parts of monomer. At the end of 24 minutes and again at 49 minutes from the start of the polymerization, 3.6 parts solid ammonium persulfate, 75 parts of the calcium bisulfite solution and 0.005 part ferrous ammonium sulfate in solution in water were added. The final water/total monomer ratio was 2.5/1. The following table shows for 4 periods of time after initiation of the polymerization, the rates of polymerization during the several periods and the cumulative yields of polymer at the end of each period, i.e. the percent of monomer introduced up to that time which had been converted into polymer.

| Period, mins. | Polymerization Rate, percent/min. | Cumulative Yields, percent |
|---|---|---|
| 0–7 | 9 | 64 |
| 7–15 | 8 | 82 |
| 15–100 | 1.1 | 97 |
| 100–300 | 0.5 | 98 |

The resulting suspension of polymer in aqueous reaction medium was filtered and washed with water. The filter cake obtained, containing 48% water, was dried;

the dried polymer had a reduced viscosity of 1.3. It gave a clear solution in a mixture of acetonitrile/nitromethane/water in the ratios 60/40/13.

Duplicating the described procedure except that no ferrous ammonium sulfate was added to the polymerization mixture, the polymerization rate for the first 7-minute period was 5.4%/min. and the polymer had a reduced viscosity of 1.4. An addition of 90 parts monomer was made at 7 minutes from the start of the polymerization. After 10 minutes from the start of the polymerization, the reaction mixture became thick and difficult to stir. The polymerization was discontinued at the end of 90 minutes, the reaction mixture was filtered and the polymer was washed with water. The water/total monomer ratio was 10/1. The filter cake thus obtained contained 78.5% water. After drying, the polymer had a reduced viscosity of 1.3. The reaction mixture was a soft curd of polymer in aqueous reaction medium, instead of the creamy suspension of polymer obtained operating in the manner described above in this example, which showed evidence of only very slight coagulation, and filtered and washed easily.

*Example 3.*—This example illustrates the effect of the presence of the ferrous iron on the polymerization as compared with adding a ferric salt to the polymerization mixture.

A magnesium bisulfite solution containing ferrous salt was prepared by dissolving 0.203 part of ferric chloride in 7000 parts of water. Seventy parts of magnesium oxide were mixed in this solution and sulfur dioxide then bubbled through it until the initial yellow color had disappeared, leaving a slightly cloudy liquid which titrated 6.2% $HSO_3$. This solution was treated by bubbling nitrogen gas through it until the solution titrated 3.92% $HSO_3$.

A polymerization mixture was prepared by mixing 4.12 parts of methyl acrylate and 37.1 parts of acrylonitrile with 623 parts of water. This mixture was flushed with nitrogen and brought to 35° C. To it were added 1.23 parts of ammonium persulfate and 15.8 parts of the magnesium bisulfite solution containing .000158 part of ferrous iron. This corresponded to 2.52% $S_2O_8$ and 1.5% $HSO_3$ based on the monomers present and 0.0256 part iron for every 100 parts bisulfite as $HSO_3$. The water/monomer ratio was 15.5/1.

Polymerization started 1 minute after the catalyst was added and was continued for a total of 6 hours. Reaction speed during the first 7 minutes after the addition of catalyst was 4.6%/min. Monomer and catalyst additions were made as follows: Two additions of .72 part of ammonium persulfate and 8.9 parts of the bisulfite solution were made at 24 and 49 minutes following initial catalyst addition. Eleven monomer additions, each amounting to 20.6 parts, of a mixture of methyl acrylate and acrylonitrile in a ratio of 10/90 were made at 7, 15, 24, 34, 49, 62, 80, 100, 130, 168 and 220 minutes following initial catalyst addition. The final water/total monomer ratio was 2.45/1.

At the end of the 6-hours reaction time, a creamy suspension of polymer was obtained in 80% yield, which filtered readily. The washed and dried polymer had a reduced viscosity of 1.6.

A run was made employing the above procedure of this example except that a magnesium bisulfite solution titrating 4.83% $HSO_3$ and containing no iron salt was used and 0.000372 part of ferric chloride was separately added in preparing the initial reaction mixture. This corresponded to an initial 0.021 part iron for every 100 parts bisulfite as $HSO_3$. Reaction started 1 min. after catalyst addition and during the initial period of 7 mins. proceeded at the rate of 5.75%/min. At 24 and 49 mins. following initiation of the polymerization, 0.00021 part ferric chloride and 7.2 parts of the 4.83% $HSO_3$ (magnesium bisulfite) solution were added together with .72 part ammonium persulfate. About a 71% yield of polymer was obtained after a total reaction time of 6½ hours. The polymer had a reduced viscosity of 5.4.

The following table shows the rates of polymerization at comparable periods near the beginning of the reactions for the two procedures of this example.

| Period | Duration, mins. | Polymerization Rate (percent/min.) | |
|---|---|---|---|
| | | Ferrous Iron | Ferric Iron |
| 1 | 8 | 9.6 | 4.7 |
| 2 | 9 | 9.4 | 1.1 |
| 3 | 10 | 6.4 | 2.2 |
| 4 | 15 | 5.4 | 1.5 |
| Average rate over the 42 minutes | | 7.7 | 2.7 |

*Example 4.*—Employing zinc bisulfite in place of the calcium or magnesium bisulfite used in the foregoing examples, the initial polymerization mixture was prepared containing 18 parts methyl acrylate and 162 parts acrylonitrile dispersed in 2700 parts water to which was added at 35° C. 5.4 parts ammonium persulfate and 54 parts of a zinc bisulfite solution titrating 5.0% $HSO_3$ and containing 20 mgs. ferrous iron per liter of solution. The composition of this initial reaction mixture corresponded to 2.52% $S_2O_8$ and 1.5% $HSO_3$, based on the monomers present, and 0.040 part iron for every 100 parts $HSO_3$. The initial water/monomer ratio was 15.3/1. During the initial 8-minute reaction period, polymerization proceeded at the rate of 9.5%/min. and the polymer formed had a reduced viscosity of 0.73.

Over a total reaction time of 135 mins., additions of 90 gms. of monomer mixture (10 methyl acrylate to 90 acrylonitrile) were made at the end of each of the following periods following initiation of the reaction: 8, 14, 22, 28, 35, 41, 52, 66, 78, 95 and 113 minutes. Additions of 3.6 parts ammonium persulfate and 36 parts of the bisulfite-ferrous iron solution were made 22, 35 and 52 minutes after start of the reaction. At 14 and 52 minutes, the polymer had a reduced viscosity of 0.89 and 0.94, respectively.

A 94% yield of polymer was obtained in the form of a creamy suspension. The washed filter cake of this polymer contained 54% water. The dried polymer had a reduced viscosity of 0.96.

*Example 5.*—The procedure of Example 2 above was followed with the following modifications, thus illustrating the use of relatively high and low concentrations of ferrous iron.

A calcium bisulfite solution titrating 2.47% $HSO_3$ and 0.004 part of ferrous ammonium sulfate dissolved in 5.5 parts of water were added to the aqueous dispersion of methyl acrylate and acrylonitrile in amounts such that the initial reaction mixture contained 2.52% $S_2O_8$ and 1.5% $HSO_3$ based on the monomers present and 0.021 part iron for every 100 parts $HSO_3$. The initial mixture contained a water/monomer ratio of 15.6/1. The polymerization reaction started immediately upon addition of the catalyst to the monomer dispersion and during the first 7 minutes proceeded at the rate of 8.9% per minute, with the polymer having a reduced viscosity of 0.79.

Over a total reaction time of 2 hours, additions of 90 parts of the monomer mixture were made at 7, 15, 24, 34, 49 and 62 minutes. After 24 minutes, 3.6 parts of ammonium persulfate, 72 parts of the calcium bisulfite solution and 2.75 parts of the ferrous ammonium sulfate solution containing 0.002 part of ferrous iron, were added. The final ratio of water/total monomer was 4.0/1.

A 99% yield of polymer was obtained as a creamy suspension of the polymer, with only slight coagulation. The polymer suspension filtered readily, and a washed filter cake containing 59.5% water was obtained. The dried polymer had a reduced viscosity of 1.1.

Employing this same procedure but introducing 68 parts of a magnesium bisulfite solution titrating 3.98% $HSO_3$ and containing 100 mgs. of ferrous iron per liter into the dispersion of methyl acrylate-acrylonitrile monomers in water together with the 5.4 parts ammonium persulfate catalyst, the polymerization started immediately upon introduction of the persulfate-bisulfite-ferrous iron. During the first 8 minutes the reaction proceeded at the rate of 10.4% per minute, with the polymer formed having a reduced viscosity of 0.51. The initial water/ monomer ratio was 15.4/1 and there was present 2.5% $S_2O_8$ and 1.5% $HSO_3$, based on the monomers, and 0.252 part iron for every 100 parts $HSO_3$.

Over a reaction time of 4 hours, additions of 90 parts of the monomer mixture were made at the end of 8, 15, 24, 34, 49, 62, 80, 100, 130 and 165 minutes. At the end of 24, 49 and 80 minutes, additions of 3.6 parts ammonium persulfate and 45 parts of the magnesium bisulfite-ferrous iron solution, were made. A 96% yield of polymer was obtained as a thick, creamy suspension of very fine particle size, with only slight coagulation. Suspension filtered readily, and the washed filter cake contained 66.7% water. The dried polymer had a reduced viscosity of 0.89.

The following examples are further illustrative of the use of our novel catalyst for copolymerizing methyl methacrylate with acrylonitrile and for copolymerizing a tertiary monomer mixture of methyl acrylate, methacrylamide and acrylonitrile.

*Example 6.*—Twenty parts methyl methacrylate and 80 parts acrylonitrile are dispersed by stirring in 1400 parts of distilled water at 20° C. To this is added 0.935 part potassium persulfate and 14 parts of a solution containing calcium bisulfite and ferrous iron titrating 2.5% $HSO_3$ and containing 6.22 mg. of iron per liter. The reaction mixture thus contains 0.665% $S_2O_8$ and 0.35% $HSO_3$, based on the monomers present, and .025 part ferrous iron for every 100 parts bisulfite as $HSO_3$. The solution is agitated for 2 hours at 20° C. Employing this procedure, an 88.5% yield of copolymer having a reduced viscosity of 2.21, was obtained as a filterable slurry.

*Example 7.*—Nine parts methacrylamide, 9 parts methyl acrylate and 82 parts acrylonitrile are dispersed in 1400 parts water at 35° C. To this there is added 1 part sodium sulfate, 2 parts ammonium persulfate and 26 parts of a magnesium bisulfite solution containing 3.9% $HSO_3$ and 10 parts of ferrous iron per liter. The composition of this initial reaction mixture corresponds to 2% $S_2O_8$ and 1.01% $HSO_3$, based on the monomers present, and 0.026 part ferrous iron for every 100 parts bisulfite as $HSO_3$.

After agitating the foregoing reaction mixture for a 90-minute reaction period at 35° C., a 95% yield of copolymer was obtained as a latex which was coagulated by freezing. The polymer recovered by filtration had a reduced viscosity of 1.1. It dissolved to form a clear solution in a 60/40/13 mixture of acetonitrile/nitromethane/water at 76° C.

We claim:

1. In a process for copolymerizing a monomer mixture of acrylonitrile, at least one member of the group consisting of the esters of acrylic and methacrylic acids with the lower saturated aliphatic alcohols, and a total of about 0 to 15% by weight of the monomer mixture of members of the group consisting of the amides of acrylic and methacrylic acids, in which monomer mixture the total of acrylonitrile and amides of acrylic and methacrylic acids amounts to more than 50%, the total ester from said group of esters of acrylic and methacrylic acids amounts to less than 50% to about 5% by weight of the monomer mixture and the ratio by weight of acrylonitrile to total amide is greater than 5/1, the monomers of said mixture being copolymerized in a reaction mixture in which the monomer mixture is dispersed in an aqueous medium containing a bisulfite and a persulfate from the group consisting of the alkali metal and ammonium persulfates to promote the polymerization of the monomers, that improvement which comprises copolymerizing said monomers in the presence in said aqueous medium of above 1% $S_2O_8$ and not more than 9% $S_2O_8$ as said persulfate, about 0.5% and not more than about 5% $HSO_3$ as a bisulfite of the group consisting of the bisulfites of magnesium, calcium, zinc, strontium and cadmium, said percentages being based on the weight of the monomer present, and at least 0.01 and not more than 0.6 weight part of ferrous iron for every 100 weight parts of $HSO_3$ present, substantially all of said iron being present in the aqueous medium as ferrous iron when the polymerization is initiated.

2. The process of claim 1 wherein the polymerization is initiated with the monomer mixture dispersed in the aqueous medium containing the bisulfite, the persulfate and the ferrous iron in amounts such that the water/monomer ratio is at least substantially 15/1, the amounts of persulfate, and bisulfite in the aqueous medium in which the polymerization is initiated are within the ranges defined by claim 1 and are such that the initial rate of polymerization over a period of 7 minutes is not less than 7% of the monomer mixture present converted to polymer per minute and the polymer formed during this initial polymerization period has a reduced viscosity no greater than 1.5, and thereafter dispersing in the aqueous medium additional quantities of the monomer mixture until the water/total monomer ratio has been decreased to no greater than 8/1 and a filterable dispersion of polymer in the form of small particles is formed.

3. The process of claim 2 wherein the aqueous medium in which the polymerization is initiated contains about 1.5% to no more than about 7% $S_2O_8$ as the persulfate and about 1% to no more than 5% $HSO_3$ as the bisulfite, and the monomer mixture dispersed in said aqueous medium is composed of more than 50% to about 95% by weight acrylonitrile and a complementary less than 50% to 5% of ester of acrylic acid with the lower saturated aliphatic alcohols, and after initiation of the polymerization additional quantities of said acrylonitrile and ester of acrylic acid are supplied to and dispersed in said aqueous medium in the foregoing proportions until the water/total monomer ratio has been decreased to no greater than about 5/1 and a filterable dispersion of polymer in the form of small particles is formed.

4. The process of claim 2 wherein the polymerization is initiated with the monomer mixture dispersed in the aqueous medium containing the bisulfite, the persulfate and the ferrous iron in amounts such that the water/monomer ratio is substantially 15/1 to about 30/1, there is dissolved in said aqueous medium in which the polymerization is initiated about 1.5% to about 3% $S_2O_8$ as the persulfate, about 1% to about 2% $HSO_3$ as the bisulfite and about 0.02 to about 0.03 part ferrous iron for every 100 parts $HSO_3$, the monomer mixture dispersed in the aqueous medium when the polymerization is initiated contains substantially 70% to 90% by weight acrylonitrile and a complementary 30% to 10% of methyl acrylate and, after initiation of the polymerization additional quantities of said monomers are supplied to and dispersed in said aqueous solution in the foregoing proportions until the water/total monomer ratio has been decreased to about 2/1 to about 5/1 and a filterable dispersion of polymer in the form of small particles is formed.

5. The process of claim 1 wherein the monomers which are copolymerized substantially consist, by weight of the monomer mixture, of more than 50% and no more than 95% of acrylonitrile and 5% to less than 50% of ester of acrylic acid with the lower saturated aliphatic alcohols, and a total of 0 to 15% of members of the group consisting of amides of acrylic and methacrylic acids.

6. The process of claim 1 in which the bisulfite is magnesium bisulfite.

7. The process of claim 1 in which the bisulfite is calcium bisulfite.

8. The process of claim 5 in which the bisulfite is magnesium bisulfite.

9. The process of claim 5 in which the bisulfite is calcium bisulfite.

10. The process of claim 2 wherein the monomers which are copolymerized substantially consist, by weight of the monomer mixture, of more than 50% and no more than 95% of acrylonitrile and 5% to less than 50% of an ester of acrylic acid with the lower saturated aliphatic alcohols, and a total of 0 to 15% of members of the group consisting of amides of acrylic and methacrylic acids.

11. The process of claim 10 in which the bisulfite is magnesium bisulfite.

12. The process of claim 10 in which the bisulfite is calcium bisulfite.

13. The process of claim 2 wherein the monomers which are copolymerized substantially consist, by weight of the monomer mixture, of more than 50% and no more than 95% of acrylonitrile and 5% to less than 50% of an ester of methacrylic acid with the lower saturated aliphatic alcohols, and a total of 0 to 15% of members of the group consisting of amides of acrylic and methacrylic acid.

14. The process of claim 13 in which the ester of methacrylic acid is methyl methacrylate and the bisulfite is magnesium bisulfite.

15. The process of claim 13 in which the ester of methacrylic acid is methyl methacrylate and the bisulfite is calcium bisulfite.

16. The process of claim 5 wherein the monomers which are copolymerized substantially consist, by weight of the monomer mixture, of more than 50% and no more than 95% of acrylonitrile and 5% to less than 50% of an ester of acrylic acid of the series methyl through decyl acrylates.

17. The process of claim 2 wherein the monomers which are copolymerized substantially consist of more than 50% and no more than 95% by weight, of acrylonitrile and 5% to less than 50% of an ester of acrylic acid of the series methyl through decyl acrylates.

18. The process of claim 3 wherein the additional quantities of monomers are supplied to and dispersed in the aqueous solution in substantially constant proportions, within the range defined in said claim.

References Cited in the file of this patent

UNITED STATES PATENTS

| | | |
|---|---|---|
| 2,380,475 | Stewart et al. | July 31, 1945 |
| 2,380,618 | Stewart et al. | July 31, 1945 |
| 2,434,054 | Roedel | Jan. 6, 1948 |
| 2,436,926 | Jacobson | Mar. 2, 1948 |
| 2,600,202 | Caird | June 10, 1952 |
| 2,777,832 | Mallison | Jan. 15, 1957 |